Nov. 10, 1964    H. T. RIGHTS    3,156,798
RESONANT FREQUENCY REED RELAY
Filed April 14, 1961    2 Sheets-Sheet 2

INVENTOR
HERBERT T. RIGHTS
BY Howson & Howson
ATTYS.

United States Patent Office 3,156,798
Patented Nov. 10, 1964

3,156,798
RESONANT FREQUENCY REED RELAY
Herbert T. Rights, Abington, Pa., assignor to James G. Biddle Co., Philadelphia, Pa., a corporation of Pennsylvania
Filed Apr. 14, 1961, Ser. No. 102,995
15 Claims. (Cl. 200—91)

The present invention concerns a reed relay, or like device, having its contacts located on structure other than the vibrating reed. More specifically, the present invention concerns a reed relay having an associated magnetic circuit, the flux pattern in an air gap of which is distorted by vibration of the reed in order to induce movement of a contact bearing means.

In the prior art, reed relays, and other devices employing vibrating reeds, have been employed to close switch contacts in electrical control circuits when the resonant frequency of the reed has been reached. Vibration has been ordinarily induced by A.C. current windings wound about small magnetic pole pieces. When the amplitude of vibration has reached a certain predetermined size, a movable contact on the vibrating reed has contacted a fixed contact thereby momentarily completing a circuit including the contacts and indicating means or some control apparatus.

The described structure has been in wide use for many years, and it has been accepted that this type of construction is subject to certain disadvantages. In the first place, a contact fixed to the vibrating reed changes the resonant frequency of that reed so that the reed must be designed in combination with the contact. Of greater importance, however, is the fact that once the movable contact on the reed engages the fixed contact, the reed's amplitude of vibration is restricted thus affecting and modifying to a marked degree the natural period of vibration of the reed and its frequency range of operation. Moreover, this effect tends to blunt and spread the response characteristic of the relay since the reed does not respond in as narrow and sharp a frequency range as it does without the contact. Conventional reed relays also suffer from the disadvantage that periodic contact requires the use of auxiliary relays because the current which can be passed by the relay is so limited.

The present invention proposes a reed relay construction whereby contacts are removed from the vibrating reed. The reed, in fact, would have a frequency determined by its natural frequency as supported on its support structure. Conventional vibration producing means is associated with the reed to cause it to vibrate at its resonant frequency. The departure from the prior art consists in the use of field producing means located relative to the vibrating reed such that vibration of the reed will distort its field. A pair of contacts is provided, one of which is a fixed contact supported relative to the support structure. The other contact is supported on a movable contact bearing means which is movable relative to the support structure and provided with a member of high magnetic permeability located in the field distortable by the vibrating reed. The arrangement is such that when field distortion occurs due to vibration of the reed, the high permeability member will be deflected and move the contact bearing means to change the condition of the contacts.

In accordance with the present invention, many variations in the reed relays and related devices are possible. For example, double reeds or tuning forks may be employed. The scope of the present invention, therefore, is limited broadly only to reed devices in which contacts are normally employed or might be normally employed.

The present invention employs a reed relay whose characteristic is unaffected by contacts. As a consequence, a sharp frequency response curve is obtained. Relay operation can be made practically independent of the manner of change in frequency which has been a problem in the past so that it makes no difference whether the resonance frequency is approached from below or from above resonance. Furthermore, this makes possible the elimination of the "hold zone," that region in which the conventional relay contacts on the vibrating reed remain closed as the frequency is swept through and above resonance.

Elimination of the contacts from the reed makes it possible for reed relays to respond to higher frequencies than is possible in present conventional relays. Furthermore, because the relays of the present invention can be made so that the contacts are held closed a greater proportion of the time than they would be in a conventional reed relay, current carrying capacity problems are essentially eliminated and there is no need for auxiliary relays in order to handle the required current for control.

Referring to the drawings, in which various embodiments of reed relays in accordance with the present invention are shown:

Figure 1:
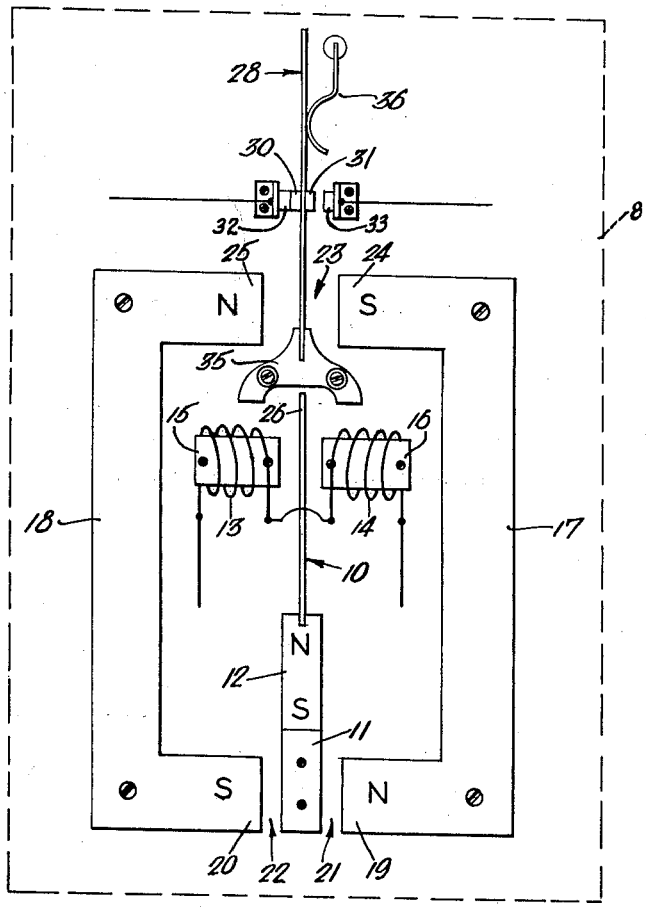
FIG. 1 illustrates one embodiment of a single reed type relay.

Referring first to FIG. 1, a vibrating reed 10 of predetermined frequency characteristics is fixed to a portion of the support structure 11 through an intermediate magnetic member 12, the function of which will be described hereafter. The reed 10 is set to vibrating by vibration producing means in the form of A.C. coils 13 and 14 wound about appropriate easily demagnetized cores 15 and 16 arranged on opposite sides of the reed so that when a current of resonant frequency passes through coils 13 and 14, the reed 10 will be set in resonant vibration. The vibration producing structure 13, 14, 15 and 16 is also supported on the support structure 8 to have a fixed position. The support structure may be of any non-magnetic material and has been composed of brass, for example. To this support are fixed all of the member which are intended not to be movable with respect to one another. The fixed members in the drawing have been indicated as fixed by showing the heads of screws used to fix them to the brass base. Preferably a structure would be spaced away from the brass base and suitable spacers would be interposed for this purpose. Also, the supports for contacts 32 and 33 must be insulated from the base if it is made of conductive material and this can be done in any suitable manner.

Magnetic field producing members 17 and 18 are also supported on the supporting structure. In this case, magnetic members are U- or C-shaped permanent magnets arranged with their north and south poles opposed to one another through suitable air gaps. The poles 19 and 20 are arranged adjacent the portion of the support structure 11, which is advantageously composed of magnetic material, so that small air gaps 21 and 22 exist. The reed 10 in this case is positioned below the air gap 23 between pole pieces 24 annd 25 which provide the primary means for producing a continuous unidirectional field within gap 23. Pole 24 is a south pole, whereas pole 25 is a north pole as shown. Pole pieces 24 and 25 may be adjusted physically laterally or magnetically to provide a change in the field strength of the gap 23. The reed 10 itself in this embodiment is made of magnetic material and magnetized by magnet 12 so that its free end 26 presents a north pole which superimposes a field to the south pole 24 and alters the field pattern which would otherwise exist between the pole pieces 24 and 25.

The movable contact bearing means in this instance is a flexible blade 28 supported on a portion of the support structure 35 and bearing in this case a normally closed movable contact 30 and a normally open movable contact 31. Normally closed movable contact 30 cooperates with fixed contact 32 which is supported on the support structure. Movable contact 31 cooperates with fixed contact 33 supported on the support structure. Supporting one end of the movable contact bearing means is a member 35 of high magnetic permeability which is fixed to the supporting structure. Member 35 extends into the magnetic field between the north pole at the end 26 of reed 10 and each of the pole pieces 24 and 25 and flux tends to concentrate in this magnetic member of high permeability. Even when the reed 26 is stationary, the field tends to move the blade 28 more toward the south pole 24 to reduce the total air gap but a spring member 36 bearing against the contact bearing blade 28 opposes this tendency and provides sufficient bias to just hold this contact bearing member in a position shown in which contacts 30 and 32 remain closed.

Figure 2:
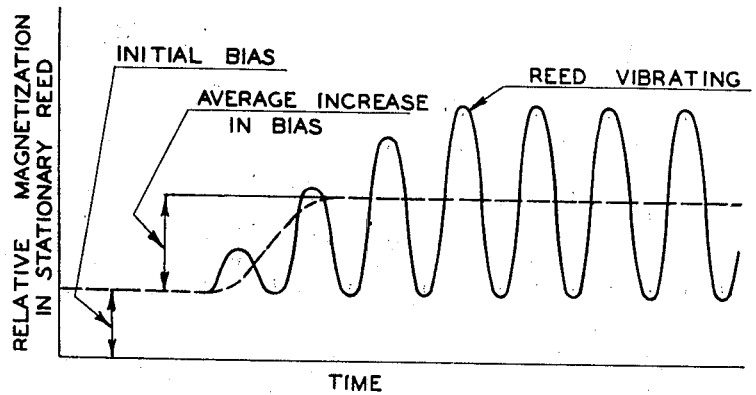
FIG. 2 shows a characteristic response curve showing the time required for a change in magnetization of the contact bearing member to occur.

Operation of the device of FIG. 1 can be best understood by reference to FIG. 2 which shows that as the resonance amplitude of the reed is reached the average value of the magnetization in the direction of pulling member 28 to the south pole greatly increases. As the reed vibrates the magnetization goes from a minimum at the rest position to a greatly increased average which overcomes the bias of a spring 36 and pulls the member 28 toward the south pole. As can be seen the overall magnetization varies with time between a minimum which is the same as that at rest position and a maximum much higher in order to produce the overall increase in averaage magnetization. By proper design the contact bearing means may be constructed to remain stationary in a position with contacts 31 and 33 closed and contacts 30 and 32 open during the whole period while reed 10 is vibrating in resonance. The diagram in FIG. 2 shows the rate of rise of magnetization may be quite rapid and the rate of decay may be rapid as well, thus making for rapid response of the relay and sharp frequency cut-off characteristics.

The spring 36 is preferably adjustable relative to the support frame on which it is mounted so that it may be set just beyond the point where it exactly balances the normal biasing effect of the magnetic field upon member 28.

The materials employed in the components may be conventional materials for the purposes served, such as soft iron for cores 15 and 16 and aluminum nickel cobalt steel alloys for permanent magnets 17, 18 and 12. The high permeability material member 35 may be soft iron or an alloy of low magnetic retentivity.

Figure 3:
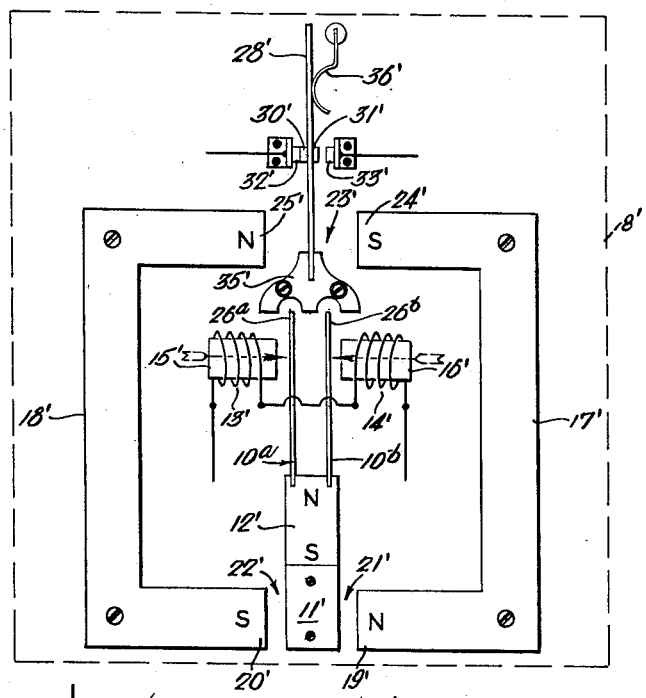
FIG. 3 shows a double reed or tuning fork structure in accordance with the present invention.

FIG. 3 shows a modified form of the structure of FIG. 1 in which a double reed or tuning fork structure is employed. Similar parts are provided corresponding to those used in FIG. 1, but with the addition of primes thereto. The double reed structure provides a pair of parallel reeds 10a and 10b fixed at their supported end to magnet 12' and having free ends 26a and 26b, respectively. At the ends of these reeds are provided individual cusps or alcoves in magnetic member 35' and again magnetic member 35' is provided with such a shape and arrangement as to serve its function most suitably.

Figure 4:
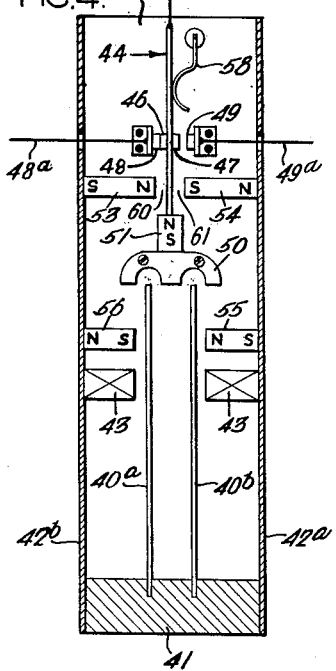
FIG. 4 illustrates a modified type of tuning fork relay arrangement.

FIG. 4 shows an alternative arrangement of reed relay employing a double reed structure. In this case, the reeds 40a and 40b are fixed to a base 41 which may be of magnetic material if desired. To the base 41 preferably is affixed a channel 42 having sides 42a and 42b providing upright supports of magnetic material upon which may be supported the vibration producing means 43 which may be a coil whose axis is parallel to or in line with the vibrating reeds 40a and 40b and which causes the reeds to vibrate by interaction of the field produced by coil 43 with the magnetic poles induced in the reeds by magnets 55 and 56. As in previous embodiments, the reeds support no contacts and instead a contact bearing means 44 is provided and affixed to a portion of the support structure by high permeability member 50 which may be connected to the support structure 42. Here the contact bearing means carries normally closed contact 46 and normally open contact 47. These movable contacts cooperate with fixed contacts 48 and 49, respectively, which are supported on support structure 42 but electrically insulated therefrom and connected in a conventional relay circuit through leads 48a and 49a, respectively, in combination with a lead 44a to contact bearing member 44. In this instance, the high permeability member 50 is likewise fixed to the support structure but is connected to the movable contact bearing member through a permanent magnet 51, which magnetizes the high permeability member 50, thus inducing in reeds 40a and 40b (composed of magnetic material in order to complete the magnetic circuits described) poles of opposite sense which are weak when reeds 40a and 40b are stationary. Magnet 51 also supplies induced magnetic poles in reed 44 at air gaps 60 and 61. Bar magnets 53 and 54 are supported on support structure 42a and 42b. Magnets 55, 56 may be of bar or horseshoe type supported by structure 42a and 42b, but are supported so that the polarity of the poles nearest the reeds 40a and 40b are both north poles. In this way, magnetic circuits are provided by magnetic member 54, contact bearing member 44, magnetic member 51, member 50, reeds 40a and 40b, and magnetic support structure 42a and 42b. Another magnetic circuit is provided having parallel branches from the south pole of magnet 54, both of which pass through contact bearing member 44, but one of which then passes through magnet 53 and support members 42a and 42b and the other of which passes through magnet 51, high permeability member 50, reeds 40a and 40b to the base member 41. In this case, the tendency is for the north induced pole in reed 44 as produced by magnet 51 at gaps 60 and 61 to cause reed 44 to be attracted to magnet 53 and repelled by magnet 53. Bias spring 58 is set to just overcome this attractive and repulsive force and is set to hold reed 44 so that contacts 46 and 48 are closed and until reeds 40a and 40b vibrate. At such time as vibration begins, the flux pattern is distributed such that the gradient tending to pull contact bearing member 44 toward magnet 54 is increased sufficiently to overcome bias spring 58 and thereby open contacts 46 and 48 and close contacts 47 and 49. As in all cases, this interrupts the electrical circuit through line 48a and closes the electrical circuit through lines 49a and 44a.

Figure 5:
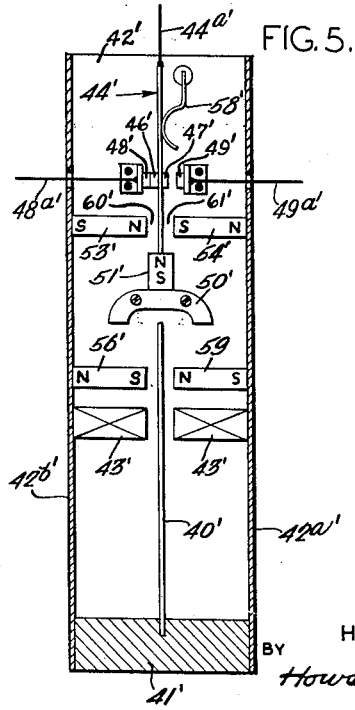
FIG. 5 illustrates an embodiment similar to that of FIG. 4 showing a single reed relay.

A similar arrangement is shown in FIG. 5 wherein corresponding numbers are designated by like corresponding numbers with the addition of primes thereto.

It will be observed from the above description that through the present invention contacts are no longer necessary on the reeds of the reed relays. Instead the contact function is transferred to a separate movable contact bearing means leaving the reeds free to vibrate at their own natural frequency without interference by contact loading and at their own natural period by amplitude of vibration. Furthermore, frequency limitations imposed by the addition of contacts are removed and higher frequency responses can be obtained with reed relays. Sharper response and sharper cut-off are also possible.

While the arrangements shown may all be mechanically symmetrical about a center line, it will be understood by those skilled in the art that other devices of unsymmetrical nature may be employed. These symmetrical arrangements are preferred because of the ability to balance forces more easily, but in some instances and for the sake of economy it may be desirable to employ non-symmetrical arrangements. Such an arrangement might be, for example, provided in the structure of FIG. 1 wherein magnet 18 is completely eliminated.

Other modifications and changes within the scope of the appended claims are intended to be within the scope and spirit of the present invention.

I claim:

1. A reed relay having no contacts on the vibrating reed, comprising a support structure, a reed consisting of magnetic material at least in part, having a predetermined resonant frequency supported from said support structure and supported at one end on the support structure so that the regions occupied by the reed during vibration are completely free of obstruction, vibration producing means associated with the reed to cause it to vibrate when its resonant frequency is reached, magnetic field producing means located relative to the vibrating reed such that vibration will distort the field, a pair of contacts one of which is fixed relative to the support structure, and movable contact bearing means for the other contact supported on the support structure and movable relative thereto and located in the field distortable by the vibrating reed such that when field distortion occurs the contact bearing means will be deflected to change the condition of the contacts as the distorted field acts upon the contact bearing means.

2. The reed relay of claim 1 in which the means producing vibration of the reed includes windings to which are applied A.C. signal whose frequency is being checked.

3. The reed relay of claim 1 in which the field producing means is permanent magnet means having at least one pole in such a position that an induced pole is produced at the free end of the reed and in which the contact carrying member is supported on a high permeability material fixed to the support structure which high permeability member is located in the field between the reed and each of the respective poles.

4. The reed relay of claim 3 in which the contact bearing means, which carries at least one movable contact, consists of a flexible blade which is supported at one end on the support structure and is free to move at its other end.

5. The reed relay of claim 4 in which the movable contact bearing means is spring biased against the effect of the field between the field producing means and the reed.

6. The reed relay of claim 4 in which both north and south pole pieces are provided with the reed and the contact carrying member between them and in which the high permeability material forms the arms of a T and is shaped to take advantage of the field between the reed and the pole pieces.

7. The reed relay of claim 6 in which the high permeability material on the movable contact bearing means forms a T such that the reed is aligned with the contact support and the arms of the T extend between the free end of the reed and the pole pieces.

8. The reed relay of claim 7 in which the poles are provided by an adjacent pair of poles of a pair of U-shaped permanent magnets arranged with their opposite poles adjacent one another.

9. The reed relay of claim 7 in which both poles are provided by bar magnets in a high permeability magnetic circuit.

10. The reed relay of claim 6 in which the movable contact bearing means is spring biased against the magnetic effect of the pole pieces to maintain alignment with the reed.

11. The reed relay of claim 6 in which the reed is a tuning fork with parallel reed members and the movable contact bearing means is spring biased against the magnetic effect of the pole pieces to maintain alignment parallel to the reed.

12. The reed relay of claim 1 in which the reed is provided with a selected polarity at its free end.

13. The reed relay of claim 1 in which the movable contact bearing means is provided with a selected polarity at its free end.

14. The reed relay of claim 1 in which the movable contact bearing means in its normal rest position supports a normally closed contact.

15. The reed relay of claim 1 in which the movable contact bearing means in its normal rest position supports a normally open contact which is closed upon distortion of the field and movement of the contact bearing means.

References Cited in the file of this patent

UNITED STATES PATENTS

| 1,205,731 | Gerdien | Nov. 21, 1916 |
| 2,160,649 | Devol | May 30, 1939 |
| 2,622,168 | Shields et al. | Dec. 16, 1952 |
| 2,763,740 | Vasquez | Sept. 18, 1956 |
| 2,906,837 | Gimson | Sept. 29, 1959 |

FOREIGN PATENTS

| 242,447 | Switzerland | May 15, 1946 |